United States Patent [19]

Chmielewski et al.

[11] Patent Number: 5,448,304
[45] Date of Patent: Sep. 5, 1995

[54] PROCESS FOR REDUCING THE NOISE OF A VIDEO SIGNAL

[75] Inventors: Ingo Chmielewski, Braunschweig; Detlef Räth, Hohenhameln, both of Germany

[73] Assignee: MB Video GmbH, Peine, Germany

[21] Appl. No.: 238,852

[22] Filed: May 6, 1994

[30] Foreign Application Priority Data

May 6, 1993 [DE] Germany .......... 43 14 980.4

[51] Int. Cl.$^6$ .......................... H04N 5/213
[52] U.S. Cl. .................. 348/619; 348/622; 348/627
[58] Field of Search ........... 348/607, 618, 620, 623, 348/622, 627; H04N 5/213

[56] References Cited

U.S. PATENT DOCUMENTS

| | | | |
|---|---|---|---|
| 4,142,211 | 2/1979 | Faroudja | 348/623 |
| 4,885,639 | 12/1989 | Nakata et al. | 348/622 |
| 4,984,074 | 1/1991 | Uomori et al. | 348/623 |

OTHER PUBLICATIONS

Lee, "Digital Image Smoothing and the Sigma Filter", *Computer Vision, Graphics, and Image Processing*, vol. 24, pp. 255–269 (1983).

Jung et al., "Adaptive Image Restoration of Sigma Filter Using Local Statistics and Human Visual Characteristics", *Electronics Letters*, vol. 24, No. 4, pp. 201–202 (Feb. 1988).

Kohout, "Noise Filtering in Colour Images", *Bild Und Ton*, vol. 43, pp. 46–47 (1990).

Lebowsky, "Hierarchical Image Quality Improvement Using Multi-Processor Systems", *Fernseh-und Kino-Technik*, 46, Jahrgang, pp. 155–164 (1992).

Primary Examiner—Victor R. Kostak
Attorney, Agent, or Firm—Foley & Lardner

[57] ABSTRACT

The present invention is a process for reducing the noise of a video signal (S1), in particular when reproducing a video signal stored on a video recorder, in which a window is defined around every signal value P (0,0,0) as an output signal value. A mean deviation ($\sigma$) of the signal values in the window is established from the output signal values P (0,0,0), and an averaging of the output signal value is carried out with those neighboring signal values in the window which lie within limit values (So, Su) for the deviation from the output signal value P (0,0,0) dependent on the established mean deviation ($\sigma$). The method is improved in its effectiveness by at least one threshold value (a1, a2) being fixed for the mean deviation ($\sigma=a/2$), by the limit values (So, Su) for a mean deviation lying below the threshold value (a1, a2) being set with values (b) dependent on the established mean deviation ($\sigma$) and by the limit values (So, Su) for a mean deviation ($\sigma$) lying above the at least one threshold value (a1, a2) being determined with a substantially constant, preselected maximum value (b2).

15 Claims, 4 Drawing Sheets

$$\bar{P} = \frac{\sum\limits_{k=ZF/2}^{ZF/2} \sum\limits_{j=YF/2}^{YF/2} \sum\limits_{i=XF/2}^{XF/2} P(x,y,z)}{ZF \cdot YF \cdot XF}$$

$$\sigma = \sqrt{\frac{\sum\limits_{k} \sum\limits_{i} \sum\limits_{j} (P(x,y,z) - \bar{P})^2}{ZF \cdot YF \cdot XF}}$$

PROCESS FOR REDUCING THE NOISE OF A VIDEO SIGNAL

BACKGROUND OF THE INVENTION

The invention relates to a process for reducing the noise of a video signal, in particular, when reproducing a video signal stored on a video recorder.

It is known for the noise reduction of video signals to use so-called sigma filters (cf., for example, JongSen Lee "Digital Image Smoothing and the Sigma Filter" in *Computer Vision, Graphics, and Image Processing* 24, 255 to 269 (1983)). The functional principle of sigma filters is based on replacing a signal value of a video image belonging to a picture element with a determined signal value which is formed by averaging the neighboring signal values, the intensity of which lies within a fixed standard deviation range (sigma range) around the intensity value of the output signal value. The basic idea of this filtering is that noise interferences occur approximately with a Gaussian distribution, so that effective noise suppression is possible within the standard deviation range. If there is a greater difference in intensity between a neighboring signal value and the output signal value, there is a high probability that this difference in intensity is determined not by noise but by some other content of the picture signal. This signal value should, therefore, not be included in the averaging.

Therefore, the mean deviation of the signal values must first be established for each defined window. Limit values are determined according to the established mean deviation. The intensity values lying within these limit values are included in the averaging.

Such a process is also known from Jung, Kim "Adaptive Image Restoration of Sigma Filter Using Local Statistics and Human Visual Characteristics", *Electronics Letters*, 1988, Vol. 24, No. 4, pages 201 to 202. For adaptation of the limit values for the sigma range, these values are fixed proportionally with respect to the square root of the signal variance ($\sigma^2$) for each pixel.

SUMMARY OF THE INVENTION

One object of the present invention is a method for improving a noise suppression process for a video system. Another object of the present invention is reducing of noise while reproducing a video signal stored on a video recorder.

Still another object of the present invention is provision of a filter circuit for removing noise from a video signal.

This and other objects are achieved by applying to the processes of Lee and others, as mentioned above, in which at least one threshold value is fixed for the mean deviation and by the limit values being determined with a substantially constant, preselected maximum value for a mean deviation lying above the at least one threshold value.

A window is defined around every signal value P as an output signal value. A mean deviation of the signal values in the window is established and an averaging of the output signal values is carried out with those neighboring signal values in the window which lie within limit values dependent on the established mean deviation, the limit values being set by values dependent on the fixed mean deviation.

According to the invention, a modified sigma filter is used to select the signal values taken for the averaging. In the case of great mean deviations of the signal values, the risk increases that the averaging will include not only noise-changed signal values, which belong substantially to the same signal content, but also signal values belonging to some other signal content.

According to the present invention, therefore, for large mean deviations, use is made of substantially fixed limit values, within which neighboring signal values are taken for averaging. It has been found that, with the process according to the present invention, a distinct improvement in the relationship between noise suppression and the obtainment of signal details is achieved.

In a still further improved embodiment of the invention, a first threshold value and a second threshold value are fixed for the mean deviation, and limit values which lie between the limit values belonging to the two threshold values are determined for a mean deviation lying between the two threshold values. This introduction of a transitional range between the limit values determined as a function of the mean deviation and the limit values determined by a maximum value for the mean deviation results in a further considerable improvement in the quality of the video picture, in particular during the reproduction of a stored video picture.

The quality improvements according to the present invention are obtained by avoidance of previously occurring fine signal details with an unnatural or three-dimensional effect, including, particular in the reproduction of human skin.

One improvement achieved by the introduction of the transitional range lies in the reduction or avoidance of break points in the function for determining the limit values.

BRIEF DESCRIPTION OF THE DRAWINGS

Further features and advantages of the present invention will become apparent to those skilled in the art to which the present invention relates from the following specification, with reference to the accompanying drawings, in which.

DETAILED DESCRIPTION OF THE PREFERRED EMBODIMENTS

In a preferred embodiment, the limit values for average deviations between the two threshold values are determined on the basis of a continuous transition function. This may preferably be linear or logarithmic. With the transition function, preferably break points at the transition between the linear parts of the characteristic curve are avoided completely, for example by a suitable logarithmic transition function.

Fixing of the intervals between the first threshold value and the second threshold value may be determined in an individual case by trial. The second threshold value preferably lies between 1.3 times and 5 times, preferably between 2 times and 3 times, the first threshold value. It has proven successful to fix the size of the threshold values proportionally to the maximum signal value. Preferably, the first threshold value is between 2 and 5%, preferably about 3%, of the maximum signal value.

Since in the initial range, below the lower threshold value a1, a=b, the transition function begins at b1=a1. The preselected maximum value b2 lies between a1 and a2 and may expediently be fixed to be of the order of $$\frac{a1 + a2}{2}.$$

If it is discovered in applying the teachings of the present invention that insufficient signal values lie within the determined limit values for carrying out the averaging, the output signal value is subjected to a different type of filtering, preferably a known median filtering per se.

To increase the detail information of the reproduced picture, it is advantageous if high-frequency signal components of the video signal are added to the noise-reduced signal. This takes place by a comparison of the output signal with the noise-reduced signal in the form of a subtraction and a subsequent coring (i.e., thresholding) of the output signal of the subtraction stage in such a way that only the high-frequency signal components with a minimum amplitude are added to the noise-reduced signal.

The process according to the invention is preferably executed with at least two-dimensional windows, that is to say taking into consideration the signal values neighboring in the line and also the corresponding signal values in the neighboring lines.

A further improvement can be achieved if, in addition, a window formation takes place over a plurality of images (fields or frames). In this case, the processed signal is delayed by at least one field.

Simple processing can be performed with discrete signal values. The process according to the invention is preferably, therefore, used on signal values to be assigned to picture elements. These may, in particular, be digital.

Figure 1:
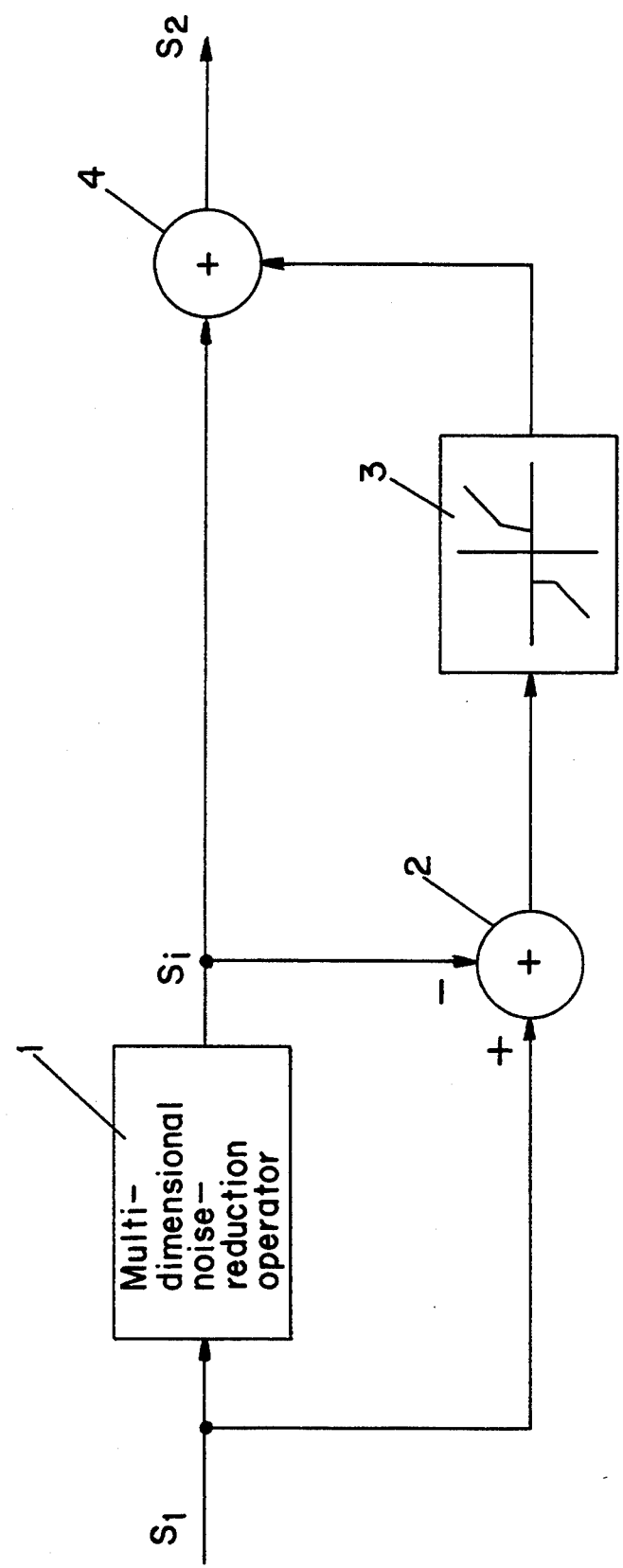
FIG. 1 is a basic diagram for signal improvement using a multi dimensional noise-reduction operator, with which the process of the present invention is carried out.

The input signal S1 represented in FIG. 1 may be any subsignal of a video signal, for example a luminance signal or one of the chrominance signals. The input signal S1 passes to a multidimensional noise-reduction operator 1, the function and operation of which is explained in more detail with reference to FIG. 2. The output of the noise-reduction operator 1 is a noise-reduced signal S1'. Signal S' is sent to the inverting input of an addition stage 2, and signal S1 is fed to the non-inverting input. Since the noise-reduction operator 1 has a low-pass effect, the differential signal occurring from the subtraction represents a high-pass signal. This passes to a coring stage (absolute value threshold circuit) 3, the characteristic curve of which is indicated in FIG. 1. The coring stage 3 allows to pass through only those signal components which lie above a certain minimum amplitude. This is done because the noise components in the high pass signal have small amplitudes, and are eliminated in this way with the coring signal. Thus, the high-frequency signal allowed to pass through the output of the coring stage 3 adds wanted signal contents again to the noise-reduced signal S1' in an addition stage 4 and the noise content is suppressed. At the output of the addition stage 4, there is consequently outputted the processed, quality-improved signal S2.

The adding of the high-frequency signal components which are available at the output of the coring stage 3 is based on the realization that, in noise reduction with noise-reduction operator 1, there may occur a suppression of high-frequency components to which belong details of the television picture and, for example, govern the reproduction of a sharp edge. The coring stage 3 ensures that the noise components, usually having small amplitudes, do not find their way back into the processed signal S1' via this adding.

Figure 2A:
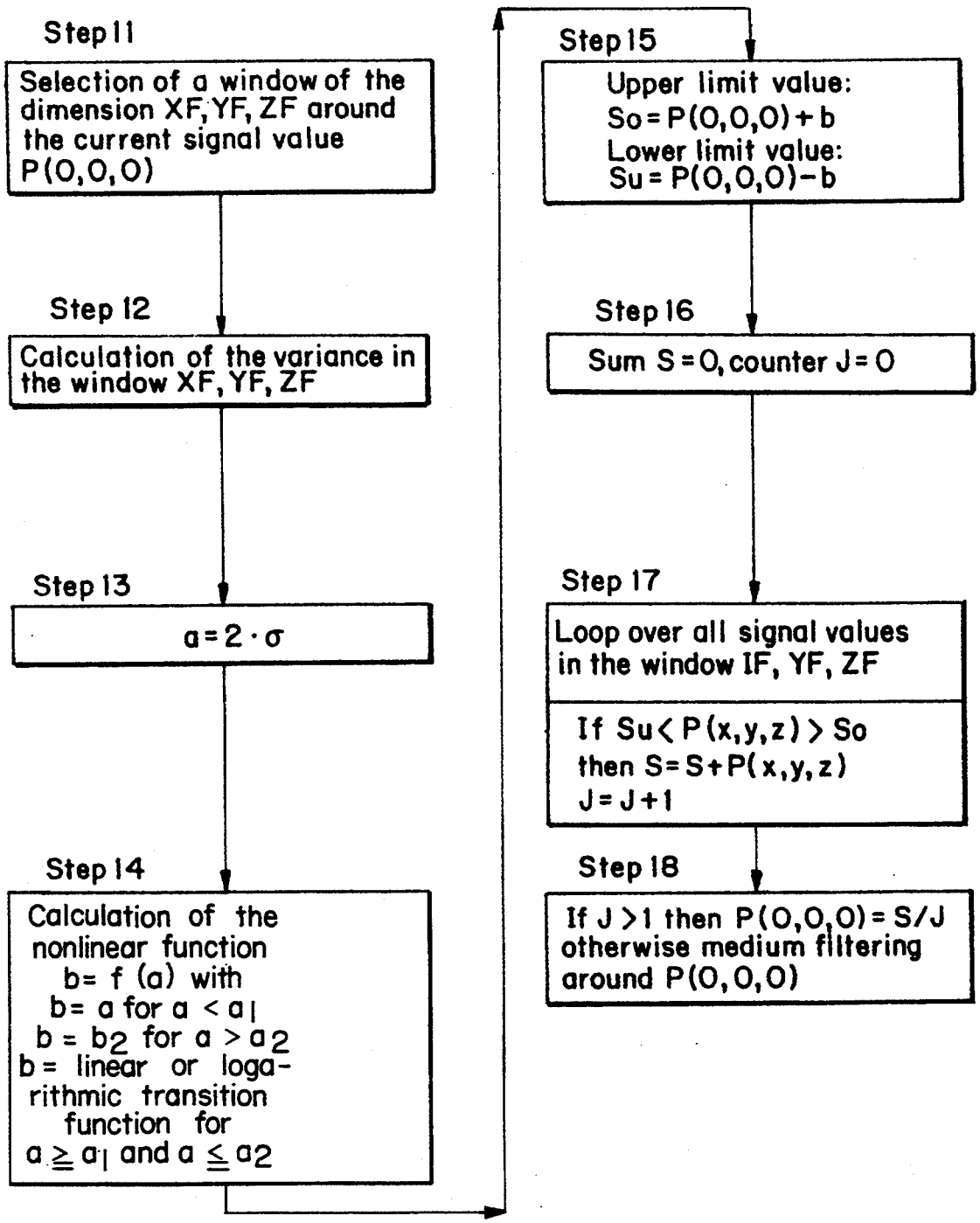
FIGS. 2A–C show a flow diagram, applicable formulas and a graph, respectively, for explaining the function of the multidimensional noise-reduction operator according to FIG. 1.
Figures 2B, 2C:
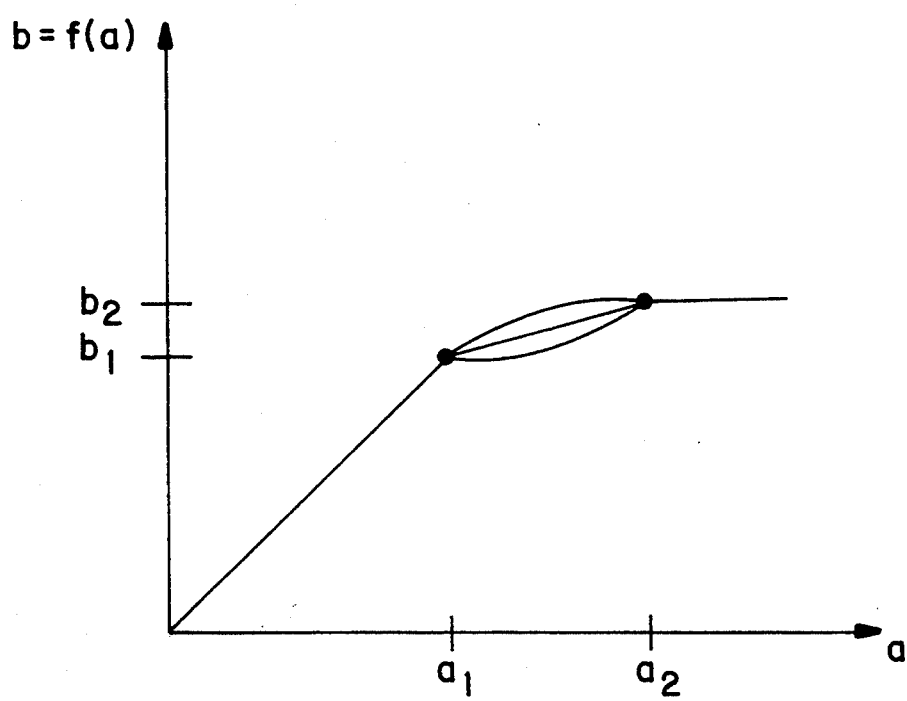

The function of the multidimensional noise-reduction operator 1 is represented in process steps in FIG. 2A. In a first process step 11, a window is defined for the current signal value, namely, the output signal value P (0,0,0). In the present case this comprises the X component (line), the Y component (column) and the time component (fields). With the signal values of the window, thus defined, the mean deviation (variance or standard deviation $\sigma$) is calculated in step 12. For this purpose, the mean value P is first determined according to the equation indicated in FIG. 2B from the signal values of the window. The standard deviation $\sigma$ is then calculated from the second equation likewise indicated in FIG. 2B in the process step 12. In the following process step 13, the determined standard deviation $\sigma$ is multiplied by 2 and consequently a variable a=2 $\sigma$ is defined.

In the next following process step 14, the values of b are determined as a function of the determined double standard deviation (a) and, up to a first threshold value a1 for the variable a, b=a. Above a second threshold value a2, b=b2 is set, i.e., b is chosen to be constant. The value of a2 is, in this case, greater than the value b1, which corresponds to the threshold value a1. For the range between the first threshold value a1 and the second threshold value a2, b is fixed by a continuous transition function, which may preferably be linear or logarithmic. The function b=f(a) is illustrated graphically in FIG. 2C. It is, therefore, possible not to enter any constant value for b above the second threshold value a2. Any increase in b should, however, be significantly weaker than below the first threshold value a1, so that b is at least substantially constant in this range.

Once the value b applicable for the determined standard deviation (a) has been established, a value range is defined in the next process step 15, with an upper limit value So=P (0,0,0)+b and a lower limit value Su=P (0,0,0)−b.

In a further process step 16, an adding memory for the signal value sum S and a counter for added signal values J are set to zero.

In a next process step 17, all of the signal values in the defined window are checked to ascertain whether they lie within the threshold values So, Su. In this case, the respective signal values P (x,y,z) are added to the sum value S and the counter reading J is incremented by 1 for each added signal value.

In concluding process step 18, it is checked to ascertain whether the counter reading J is greater than 1. If so, the signal value P (0,0,0) is fixed at the mean value S/J, that is to say at the mean value over all signal values lying within the limit values So, Su. If no further signal value P (x,y,z) lies within the limit values So, Su, of course, no averaging can take place. In this case the signal value P (0,0,0) is subjected to a median filtering with neighboring signal values. At the end of the process step 18 (or after median filtering has taken place) the signal S1' is available.

The noise-reduction operator 1 with the function as described with reference to FIG. 2 can be realized as a hardware circuit and is, therefore, capable of real time operation to the extent required.

Figure 3:
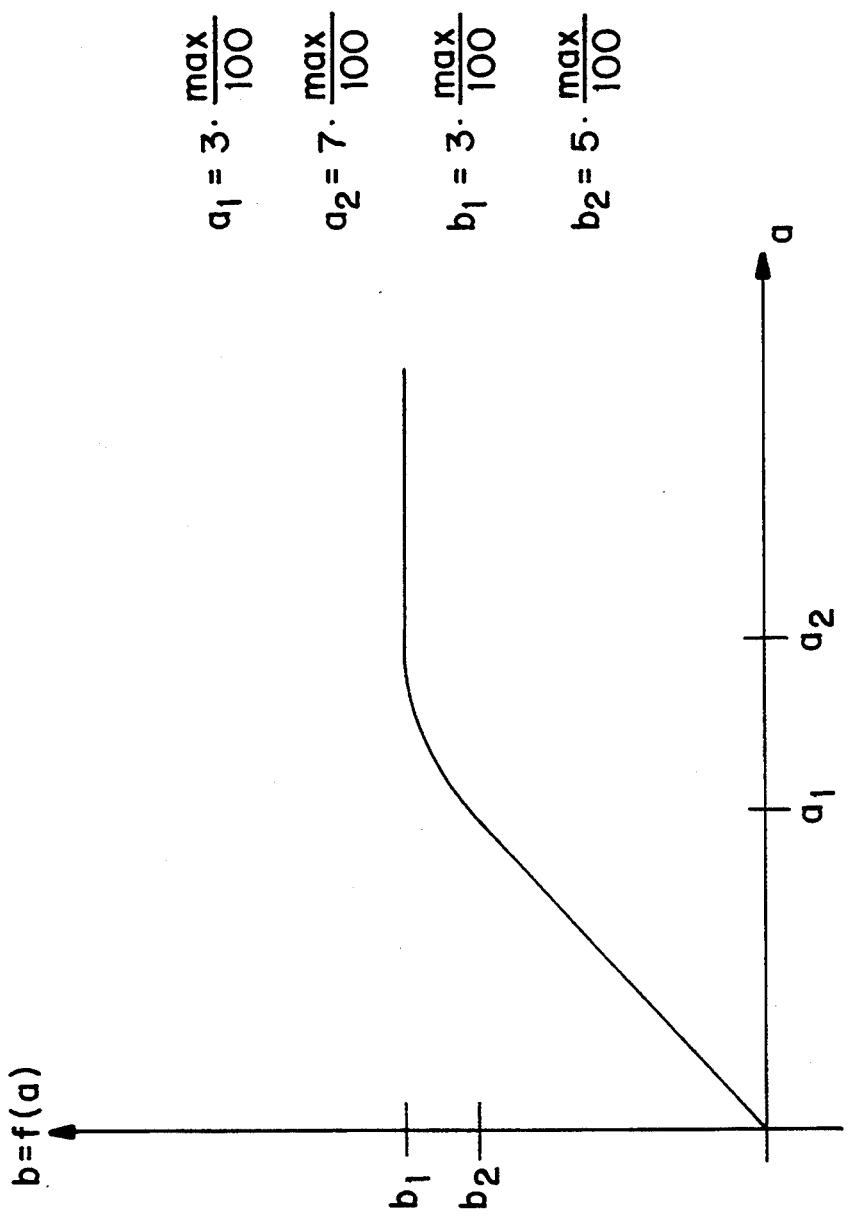
FIG. 3 shows a characteristic curve b=f(a) for fixing the parameters determining the limit values.

FIG. 3 shows by an illustrative embodiment a function $b=f(a)$ in which the values a1, a2, b1 and b2 are fixed proportionally to the maximum signal value max, where $a1=3/100$ max, $a2=7/100$ max, $b1=5/100$ max and $b2=\sigma/100$ max. In an 8-bit digitization of the signal values, the maximum signal value max is, for example 225.

FIG. 3 also illustrates that a transition function between a1 and a2 which completely avoids breaks in the characteristic curve can be realized.

What is claimed is:

1. A process for reducing noise in a video signal having a plurality of output signal values, comprising the steps of:
    defining a window for the output signal values;
    establishing a mean deviation of the signal values in the window;
    averaging the output signal values in the window with neighboring signal values in the window which lie within limit values derived from the established mean deviation, the limit values being set by a fixed mean deviation to obtain a corresponding averaged signal value for each output signal value; and
    replacing the output signal values by the corresponding averaged signal values to thereby produce a noise-reduced signal;
    wherein, at least one threshold value is fixed for the established mean deviation and wherein the limit values for a mean deviation lying above the at least one threshold value are determined with a substantially constant, preselected maximum value.

2. The process as claimed in claim 1, wherein a first threshold value and a second threshold value are fixed for the mean variations and wherein limit values belonging to the two threshold values are determined for a mean variation lying between the two threshold values.

3. The process as claimed in claim 2, wherein the limit values for mean deviations between the two threshold values are determined on the basis of a continuous transition function.

4. The process as claimed in claim 3, wherein the transition function is linear.

5. The process as claimed in claim 3, wherein the transition function is logarithmic.

6. The process as claimed in claim 1, wherein the output signal value is subjected to a different type of filtering if insufficient signal values of the window lie within determined limit values.

7. The process as claimed in claim 2, wherein the second threshold value lies between 1.3 times and 5 times the first threshold value.

8. The process as claimed in claim 7, wherein the second threshold value lies between 2 times and 3 times the first threshold value.

9. The process as claimed in claim 7, wherein the first threshold value is between 2 and 5% of a maximum signal value.

10. The process as claimed in claim 9, wherein the first threshold value is about 3% of the maximum signal value.

11. The process as claimed in claim 9, wherein the preselected maximum value lies between the two threshold values.

12. The process is claimed in claim 1, wherein at least a two-dimensional window is used.

13. The process as claimed in claim 1, wherein signal values are assigned to picture elements.

14. The process as claimed in claim 13, wherein said video signals is digital video signal.

15. The process as claimed in claim 1, wherein high-frequency signal components of the video signal lying above a minimum amplitude are added to said noise-reduced signal.

* * * * *